(12) United States Patent
Slavchev (10) Patent No.: US 6,575,712 B1
(45) Date of Patent: Jun. 10, 2003

(54) AIR COMPRESSOR SYSTEM

(76) Inventor: Slavcho Slavchev, 1201, 17th St., Apt. 103, Miami Beach, FL (US) 33139

( * ) Notice: Subject to any disclaimer, the term of this patent is extended or adjusted under 35 U.S.C. 154(b) by 0 days.

(21) Appl. No.: 09/967,597

(22) Filed: Sep. 28, 2001

(51) Int. Cl.$^7$ .................... F04B 17/00; F04B 35/00
(52) U.S. Cl. ................. 417/331; 417/330; 60/497
(58) Field of Search ................. 417/330, 331, 417/332, 333; 405/76, 21, 26, 195.1; 60/398, 495, 497, 498, 501, 505

(56) References Cited

U.S. PATENT DOCUMENTS

| | | | | |
|---|---|---|---|---|
| 3,598,505 A | * | 8/1971 | Greene | 417/330 |
| 4,164,383 A | * | 8/1979 | French | 417/330 |
| 4,206,601 A | * | 6/1980 | Eberle | 60/398 |
| 4,408,454 A | * | 10/1983 | Hagen et al. | 60/500 |
| 4,683,719 A | * | 8/1987 | Martinak | 60/398 |
| 5,052,902 A |   | 10/1991 | Labrador | 417/330 |
| 5,701,740 A | * | 12/1997 | Tveter | 60/505 |
| 6,132,180 A | * | 10/2000 | Kojima | 417/333 |

* cited by examiner

*Primary Examiner*—Charles G. Freay
*Assistant Examiner*—Han L. Liu
(74) *Attorney, Agent, or Firm*—J. Sanchelima; A. Bordas

(57) ABSTRACT

An air compressor system utilized in a body of water that produces compressed air from water wave energy. The air compressor system includes floating structures in a body of water designed to receive ambient air and produce compressed air, utilizing a bellow assembly. The air compressor system converts water wave energy into storable and consumable energies, such as compressed air in a storage tank. The instant invention primarily comprises a low-wave air compressor, high-wave air compressor, and a stabilizing system.

6 Claims, 5 Drawing Sheets

AIR COMPRESSOR SYSTEM

BACKGROUND OF THE INVENTION

1. Field of the Invention

The present invention relates to air pumps, and more particularly, to an air compressor system utilized in a body of water, that produces compressed air from water wave energy.

2. Description of the Related Art

Many designs for air compressor systems have been designed in the past. None of them, however, include floating structures in a body of water designed to receive ambient air and produce compressed air, utilizing a bellow assembly.

Applicant believes that the closest reference corresponds to U.S. Pat. No. 5,052,902 issued to Labrador. However, it differs from the present invention because Labrador teaches a water-wave-energy converter set out floating on the ocean to convert the energy of the water waves into storable and consumable energies which is a composition of several cylinders joint end. after end, decreasing in diameter by end after end, having a piston with one-way valves in each cylinder, having one-way valves on every partition wall between cylinders, a single long piston rod common to all cylinders that moves each of the piston synchronically to push the compressed air towards its smaller end.

Additionally, U.S. Pat. No. 5,179,837 issued to Sieber also differs from the present invention. Sieber teaches a method and device provided for generating energy from the motion of waves, where fluid is conveyed through a series of fluid pressurization units, each unit incrementally increasing the pressure of the fluid as the fluid passes under the force of differential pressure within that unit. The pressurized fluid from a preceding unit is outlet from that unit and input into the succeeding unit in series. Each unit includes a first member and an associated second member, the first member being immersed in or floating on the surface of a body of water, the first member rising and falling with the rise and fall of wave motion, and the second member being submerged and anchored. The fluid is pressurized as the result of the relative movement between the first and second members as the fluid passes through a unit. The pressurized fluid may then be used to drive turbines and electric generators or other energy conversion devices.

Other patents describing the closest subject matter provide for a number of more or less complicated features that fail to solve the problem in an efficient and economical way. None of these patents suggest the novel features of the present invention.

SUMMARY OF THE INVENTION

The instant invention is an air compressor system, comprising a floating housing assembly anchored to a fixed point. It comprises at least one opening to allow liquid to enter and further includes bellow means housed within. The bellow means are slidably mounted therein for longitudinal movement between two extreme positions. The bellow means have an air intake and air outtake so that as a result of movement of said liquid through said opening, said bellow means expands and contracts, taking in air through said air intake and forcing said air through said air outtake. Additionally, the air compressor system further includes reservoir means from said outlet means.

More specifically, the air compressor system comprises a first housing assembly with first and second ends. The first housing assembly having a first air vent protruding from said first end and anchor means secured to said second end. The first housing assembly having at least one hole for a wave of water to enter and a platform with third and fourth ends. The third end having a first bellow assembly secured thereon, the fourth end having at least one cable connecting to a first spring, which is secured to said second end. The fourth end further has a first air line with fifth and sixth ends to deliver compressed air from said first bellow assembly. The first air line having a first one-way valve set at a first predetermined distance from said fifth end towards said sixth end without reaching said sixth end, to effect the axial flow of compressed air along the length of said first air line. The platform has first cycling means to compress air within said first bellow assembly when said wave of water enters said first housing assembly. The platform has at least one end-stop that limits the travel distance of said platform.

A second housing assembly has seventh and eighth ends. The second housing assembly having a second air vent protruding from said seventh end and anchor means secured to said eighth end. The second housing assembly having a float with ninth and tenth ends and further comprising a second bellow assembly. The float having first means to cooperate with said second bellow assembly and has at least one cable connecting to a second spring, which is secured to said eighth end. The eighth end has a second air line with ninth and tenth ends to deliver compressed air from said second bellow assembly. Additionally, the second air line has a second one-way valve set at a second predetermined distance from said ninth end towards said tenth end without reaching said tenth end, to effect the axial flow of compressed air along the length of said second air line. The float has second cycling means to compress air within said second bellow assembly when said wave of water contacts said float. The float has at least one stop-spring above and below said float.

A stabilizing system with means to stabilize said first and second housing assemblies is in a body of water, also comprising an air tank to receive said compressed air from said first and second air lines. The stabilizing system further comprises buoys at either side of said first and second housing assembly. The buoys are secured to said first and second housing assembly with a first cable having eleventh and twelfth ends. The eleventh and twelfth ends having first weights, said stabilizing system further comprising first and second pontoons at a first predetermined depth in said body of water. The pontoons with anchoring means and having a pulley connected to first and second springs to coact with said first cable.

The first cycling means for said platform further includes a flow of said wave of water in and out of said first housing assembly, causing the movement of said platform and said first bellow assembly, whereby ambient air enters said first bellow assembly through a third one-way valve within said first air vent upon a downward platform movement when said wave of water exits said first housing assembly, and compressed air escapes from said first bellow assembly through said first one-way valve within said first air line, upon an upward platform movement when said wave of water enters said first housing assembly.

The second cycling means further includes a flow of said wave of water onto said float, causing the movement of said float, said float cooperating with said second bellow assembly whereby ambient air enters said second bellow assembly through a fourth one-way valve within said second air vent upon a downward float movement when said wave of water exits said second housing assembly, and compressed air escapes from said second bellow assembly through said second one-way valve within said second air line, upon an upward float movement when said wave of water strikes said second housing assembly.

The first and second air vents includes an end-cap to prevent foreign matter from entering and the air tank has a pressure relief valve.

It is therefore one of the main objects of the present invention to provide an air compressor system to efficiently and safely produce compressed air.

It is still another object of the present invention to provide an air compressor system that utilizes wave energy in an open water setting.

It is another object of this invention to provide an air compressor system that requires low maintenance.

It is another object of this invention to provide an air compressor system that prevents beach erosion.

It is yet another object of this invention to provide an air compressor system that is environmentally friendly.

It is another object of this invention to provide an air compressor system that may be utilized in any body of water having waves.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 3c represents an isometric side view of the low-wave air compressor.

DETAILED DESCRIPTION OF THE PREFERRED EMBODIMENT

Referring now to the drawings, where the present invention is generally referred to with numeral 10, it can be observed that it basically includes high-wave pump assembly 20, low-wave pump assembly 120, and stabilizing assembly 220.

Figure 1:
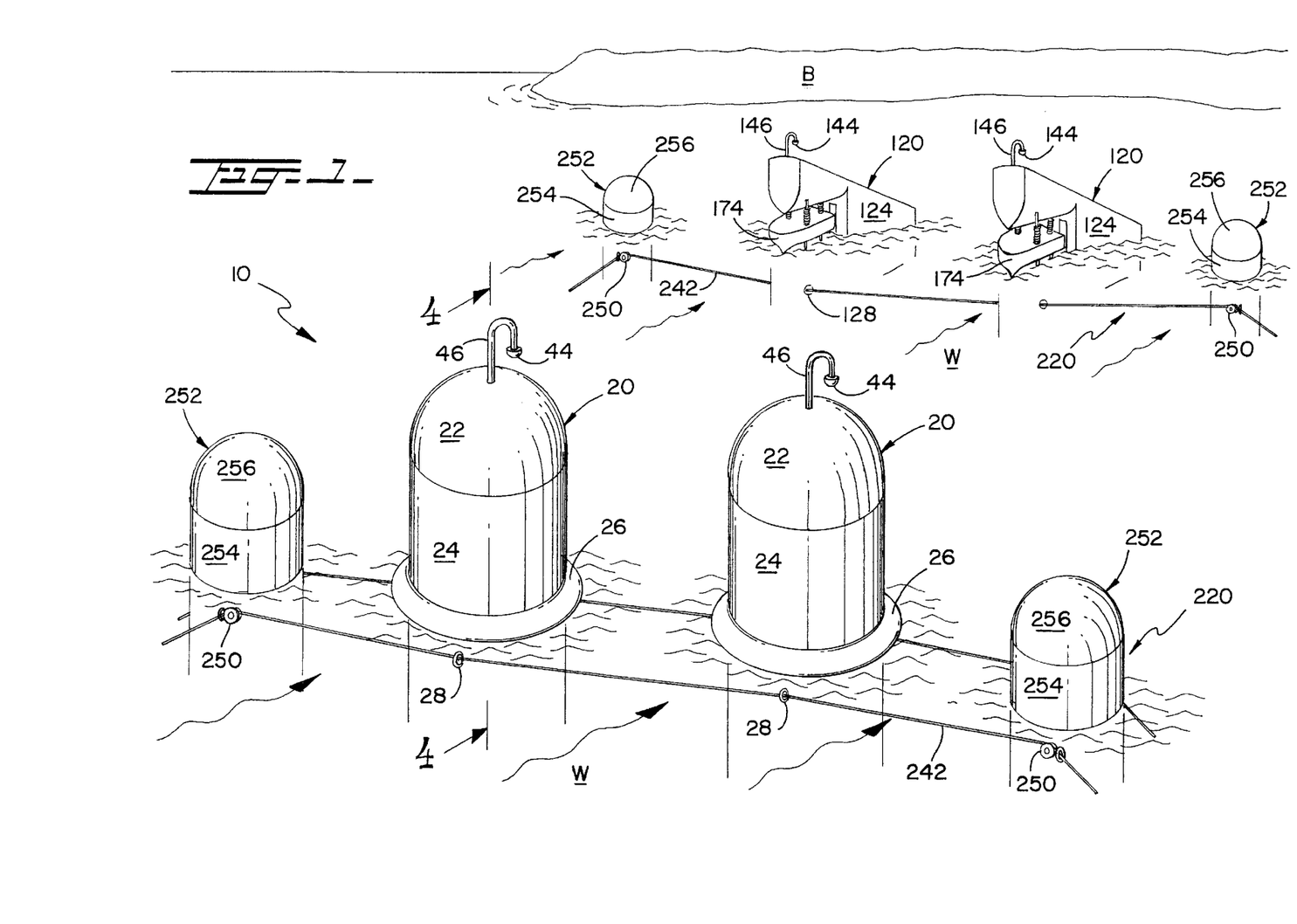
FIG. 1 represents a perspective view of the air compressor system in a body of water.

As seen in FIG. 1, instant invention 10 operates in a body of water W. The body of water is one that has sufficient wave curl to operate high-wave pump assembly 20 and low-wave pump assembly 120.

High-wave pump assembly 20 is designed to withstand waves over seven feet high and has a cylindrical housing 24 in the preferred embodiment. Secured around housing 24 is ring 26, where a predetermined water line is established. Removably secured to housing 24 is hood 22. Hood 22 is shaped with curvature to allow water W to easily flow over in the event of large waves. Perpendicularly protruding from hood 22 is tube 46, for air to flow through, having end-cap 44. Tube 46 is curved near the endpoint where end-cap 44 is, to prevent water W from entering, in the event a wave flows over tube 46. Below ring 26, housing 24 has at least two rings 28, approximately 180 degrees from each other. Passing through ring 28 is cable 242 of stabilizing system 220.

To stabilize high-wave pump assembly 20, or a series of them connected, is stabilizing system 220. Shown here, stabilizing system 220 has buoys 252 at the extreme ends of high-wave pump assemblies 20. Buoys 252 float at the endpoints to stabilize high-wave pump assemblies 20. Similar to high-wave pump assemblies 20, buoys 252 have cylindrical housing 254 with hood 256 secured thereon. Secured to housing 254 is pulley 250, where cable 242 coacts thereon.

Low-wave pump assembly 120 is designed to withstand waves below seven feet high and has housing 124 in the preferred embodiment. Low-wave pump assembly 120 is generally closer to land or beach B, as shown, and faces oncoming waves as depicted. Perpendicularly protruding from housing 124 is tube 146, for air to flow through, having end cap 144. Tube 146 is curved near the endpoint where end cap 144 is, to prevent water W from entering in the event a wave flows over tube 146. Below a predetermined water line, housing 124 has ring 128. Passing through ring 128 is another cable 242 of stabilizing system 220.

To stabilize low-wave pump assembly 120, or a series of them connected, is stabilizing system 220. Shown here, stabilizing system 220 has buoys 252 at the extreme ends of low-wave pump assemblies 120. Buoys 252 float at the endpoints to stabilize low-wave pump assemblies 120. Similar to high-wave pump assemblies 20, buoys 252 have cylindrical housing 254, with hood 256 secured thereon. Secured to housing 254 is pulley 250, where cable 242 coacts thereon.

Figure 2:
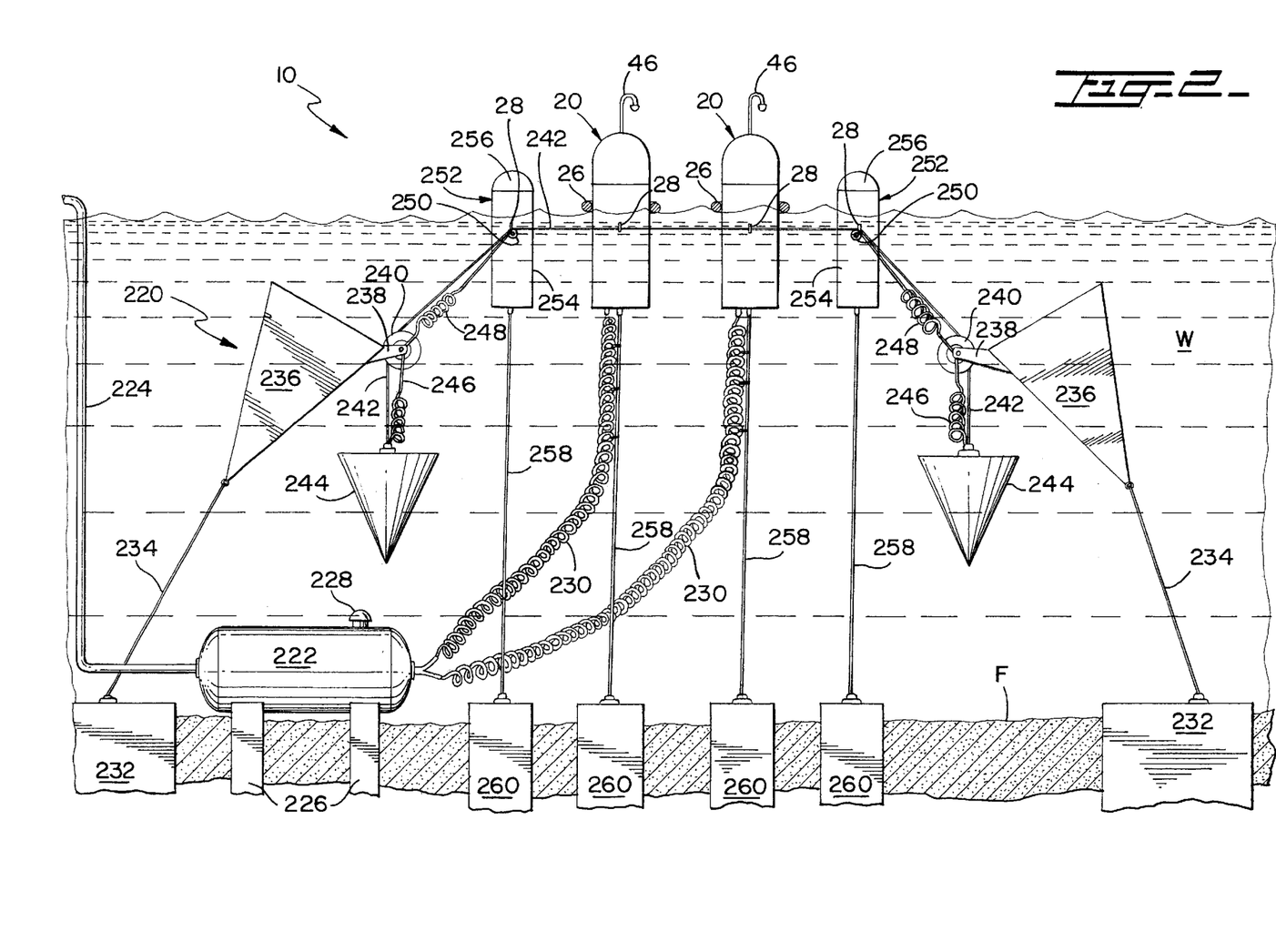
FIG. 2 shows an elevational view of the instant invention including the stabilizing system.

As seen in FIG. 2, instant invention 10 is an air compressor system designed to produce and send pressurized air to compressed air tank assembly 222. Stabilizing assembly 220 secures high-wave pump assemblies 20 and low-wave pump assemblies 120, to ensure they remain securely fastened to one another and remain in optimal positions with regard to wave patterns.

As shown here, weights 260 are placed on floor F of body of water W. Weights 260 are used to anchor buoys 252 and high-wave pump assemblies 20. In a low-wave body of water, stabilizing assembly 220 is also utilized. Compressed air tank 222, of stabilizing assembly 220, may be shared by high-wave pump assembly 20 and low-wave pump assemblies 120, or each may have their own. Extending from weights 260 are cables 258 of a predetermined length to allow buoys 252 and high-wave pump assemblies 20, as shown here, to float on the surface of water W.

Weights 232 at the extreme ends of instant invention 10, provide additional stabilization. Weights 232 are also set on floor F of body of water W. Extending from weights 232 are cables 234, which are secured to pontoons 236. Pontoons 236 are set at a predetermined depth and are buoyant. Extending from pontoons 236 is connector 238 having pulley 240 thereon.

Weights 244 are of a predetermined mass to also stabilize instant invention 10. Viewing FIG. 2 from left to right, cable 242 is secured from weight 244 at one end-point, over pulleys 240 and 250, through rings 28, over pulleys 250 and 240, and onto weight 244 at the other end-point. In addition, spring 248 connects buoy 252 to pulley 240 and spring 246 connects pulley 240 to weight 244. This portion of stabilizing system 220 compensates for the differences in wave length and wave height that are encountered by instant invention 10, whereby a certain wave may affect one portion of the instant invention, and as the wave continues, it then affects a different section. The stabilizing system, as a whole, allows the high-wave pump assemblies 20 to ride the waves of water W and use the waves as energy to produce compressed air. Extending from high-wave pump assemblies 20 are compressed air lines 230, which deliver compressed air to compressed air tank 222. Emergency air release valve 228 prevents over pressurization in compressed air compressed air tank 222 in the event too much compressed air is introduced. Compressed air tank 222, having foundations 226, may be located on floor F of body of water W as shown, or may located above water such as on a bridge, pontoon, barge, dock, or any other surface. Line 224 extends from compressed air tank 222 to means for effectively utilizing the compressed air, not shown.

Figures 3A, 3B:
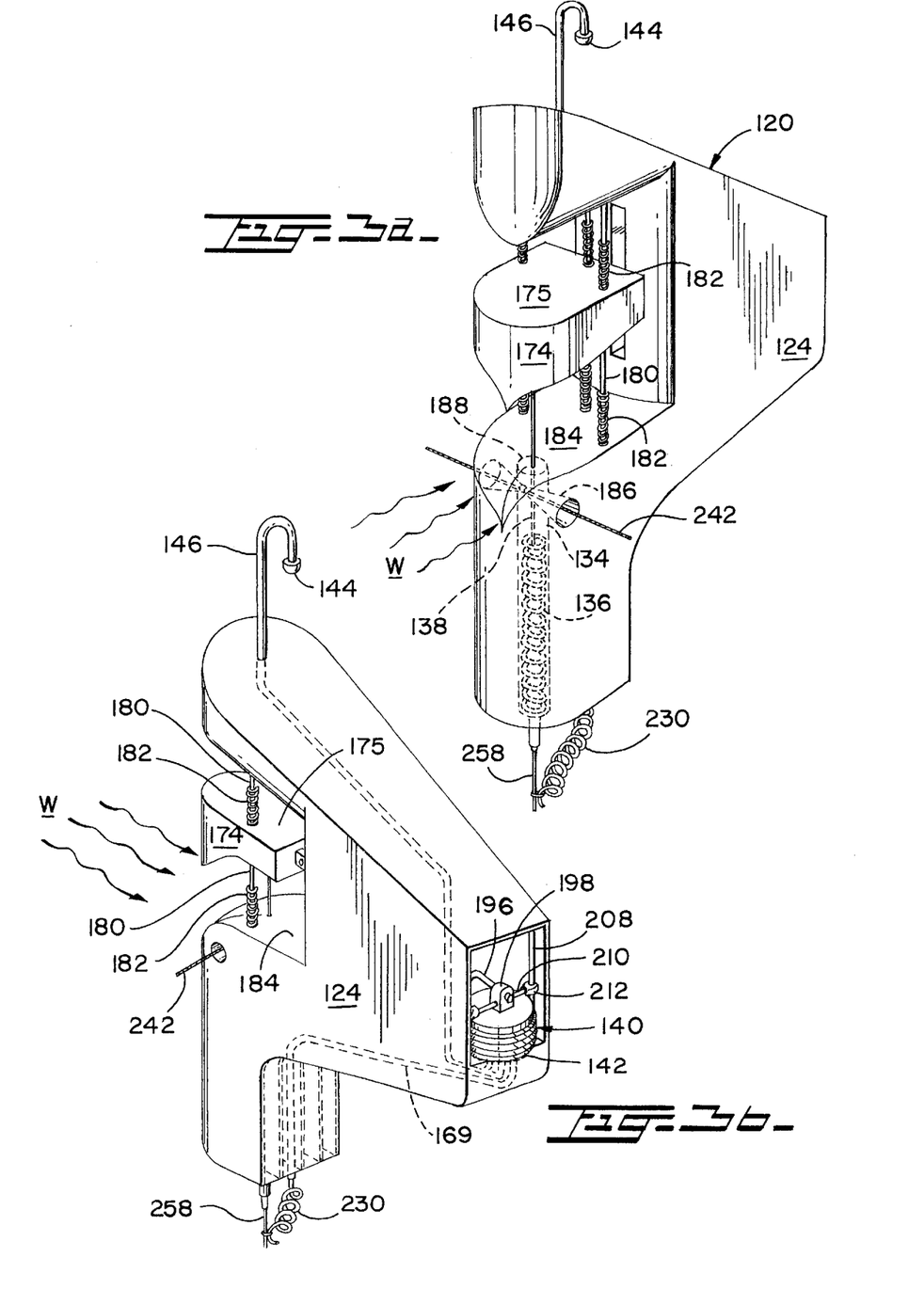
FIG. 3a represents an isometric front side view of the low-wave air compressor.
FIG. 3b represents an isometric rear side view of the low-wave air compressor.

As shown in FIG. 3a, low-wave pump assembly 120 has housing 124. Housing 124 is shaped to effectively receive waves from water W, whereby waves cooperate with float 174. Float 174 travels vertically on at least one rod 180. Springs 182 rest upon face 175 of float 174 and face 184 of housing 124 to cushion float 174 as a wave arrives and departs low-wave pump assembly 120. As previously mentioned, cable 258 is fixedly secured to housing 124. Within housing 124 is cylinder 134, which is fixedly secured to a bottom section of housing 124, but not attached to cable 258. Cylinder 134 houses spring 136 within, which is secured to the same bottom section of housing 124. Extending from spring 136 is cable 138 of a predetermined length, which trespasses through bearing 188 and secures to float 174. Spring 136 pulls float 174 in a downward direction but allows float 174 to travel in an upward direction when met by a wave. Cable 242 trespasses housing 124 through cones 186, which are secured to bearing 188. Bearing 188 allows housing 124 to swivel in order to face waves from water W optimally.

As seen in FIG. 3b, bellow assembly 140 is located near the rear section of housing 124. When float 174 receives a wave, it will travel in an upward direction. Through a series of connectors, best seen in FIG. 3c, bellow assembly 140 is activated to compress air received through tube 146. Bellow assembly 140 has bellow 142. Secured above bellow 142 is connector 198. Connector 198 receives arm 196, and rod 210. Bellow 142 travels vertically, whereby couplings 212, which are secured to rod 210, slide upon rods 208 at either side of bellow assembly 140.

As seen in FIG. 3c, shaft 192 acts like a fulcrum, whereby float 174 travels in an upward direction, causing bellow 142 to compress in a downward direction and vice-versa. Pin 202 connects connector 204 to the rear section of float 174. Extending from connector 204 is arm 200, which connects to connector 194 of connecting assembly 190. Arm 196 extends from connector 194 to connector 198. Extending from bellow assembly 140 is tube 146, which protrudes from the top section o housing 124. Additionally, outlet tube 169 extends from bellow assembly 140 through housing 124 to the bottom section and connecting to compressed air line 230, which connects to compressed air tank 222, seen in FIG. 4. To reduce stress that may be caused with the movement of float 174, face 176 of housing 124 is of a curvature shape to allow water to flow and disperse to the sides of housing 124. Face 184 is shaped to cooperate with float 174 and provide optimal travel distance of float 174. To properly float, housing 124 is a watertight structure with the exception of slot 206, which allows for connecting assembly 190 to operate. Float 174 is also a watertight structure. As best seen here, bearing 188 allows for housing 124 to swivel in the event the direction of wave change from water W.

Figure 4:
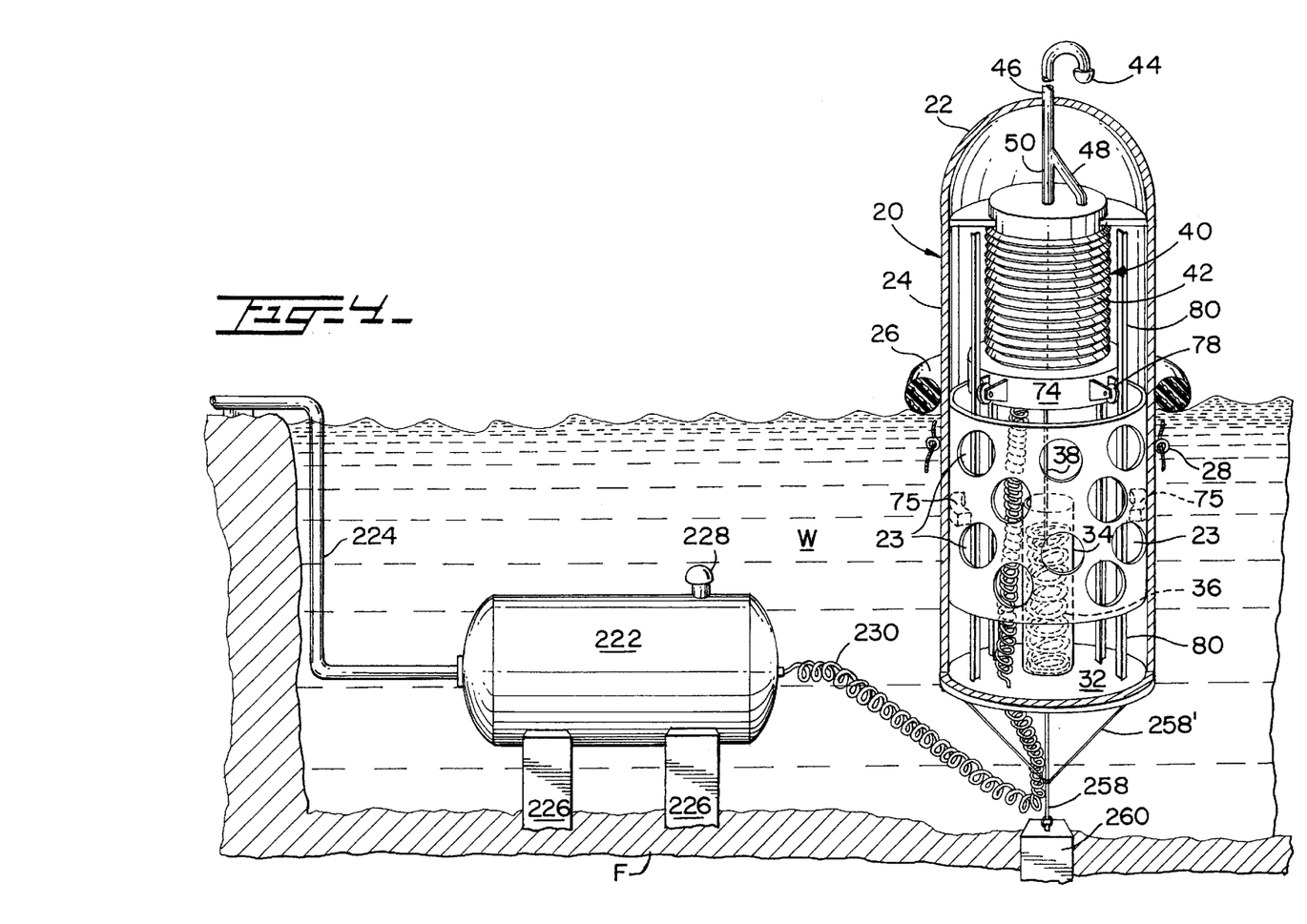
FIG. 4 represents an isometric view of the high-wave air compressor.

As seen in FIG. 4, in the preferred embodiment, high-wave pump assembly 20 is cylindrically shaped, although it may be of a variety of shapes, including but not limited to, triangular, square, octagon, and hexagon. Secured to the top end of housing 24 is bellow assembly 40. Protruding from bellow assembly 40 are residual tube 50 and inlet tube 48, which merge to form tube 46. Bellow assembly 40 has bellow 42 that is attached to platform 74, which floats. Within housing 24 is cylinder 34, which is fixedly secured to base 32 of housing 24, but not attached to cable 258. Cylinder 34 houses spring 36 within, which is secured to base 32 of housing 24. Extending from spring 36 is cable 38 of a predetermined length, which secures to platform 74. Spring 36 pulls platform 74 in a downward direction but allows platform 74 to travel in an upward direction when met by a wave. Below ring 26, housing 24 has holes 23. Holes 23 are sufficiently large to allow water W to enter when a wave approaches high-wave pump assembly 20. Housing 24 acts as a cylinder assembly whereby platform 74 is raised and lowered by the buoyancy force from water waves when water W enters and exits housing 24 through holes 23. Fixedly secured at various points to the inside face of housing 24 are end stops 75. End stops 75 are designed to limit the downward travel of platform 74 when water W exits housing 24. Wheels 78 are removably secured to connector 76, seen in FIG. 5b, at predetermined positions to platform 74. Wheels 78 allow platform 74 to ride on tracks 80 secured from base 32 of housing 24 to the top of housing 24. Housing 24 also has cables 258' for additional stability, which are secured to cable 258.

In a body of water, as waves approach high-wave pump assembly 20, water W enters holes 23 of housing 24. This causes platform 74 to raise. As platform 74 is raised, bellow 42 compresses. As air compresses within bellow 42, it is forced out through outlet tube 69, through outlet valve 68, seen in FIG. 5b, through compressed air line 230 and to compressed air tank 222.

Figure 5A:
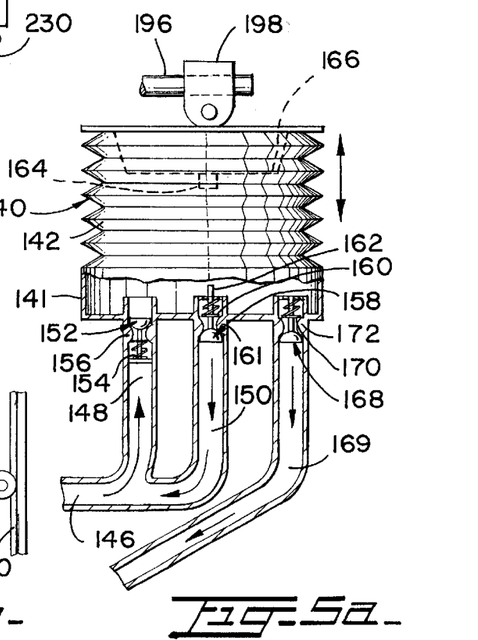
FIG. 5a represents an isometric view of the low-wave air compressor bellow system.

As seen in FIG. 5a, bellow assembly 140 has bellow 142 secured between base 166 and valve base 141. Base 166 complements the height of bellow 142 in a collapsed mode, so that a maximum amount of air within bellow 142 is displaced from and to the adjacent valves. Base 166 has connector 198 attached thereon, with arm 196 secured to it. In addition, base 166 has tip 164 to coact with residual valve tip 162 when biased against it. Valve base 141 primarily includes inlet valve 152, residual valve 158, and outlet valve 168. Extending from valve base 141, inlet valve 152 has inlet spring 154, which keeps inlet valve 152 biased against inlet protrusions 156 in the relaxed state. Extending from valve base 141, residual valve 158 has residual spring 160, which keeps residual valve 158 biased against residual protrusions 161 in the relaxed state. Extending from valve base 141, outlet valve 168 has outlet spring 170, which keeps outlet valve 168 biased against outlet protrusions 172 in the relaxed state.

When float 174, seen in FIG. 3c, travels in a downward direction, bellow 142 expands. As bellow 142 expands, the force within overcomes the force of inlet spring 154, opening inlet valve 152 and allowing air to flow from tube 146 through inlet tube 148, and into bellow 142. When float 174, seen in FIG. 3c, travels in an upward direction, when met by a water wave, bellow 142 contracts. As bellow 142 contracts, the force of compressed air within overcomes the force of outlet spring 170, opening outlet valve 168 and allowing compressed air to flow through outlet tube 169, which connects to compressed air line 230, seen in FIG. 3c. After bellow 142 is fully compressed there may remain some residual air. In that case, any remaining residual air will flow out through residual tube 150 when tip 164 makes contact with residual valve tip 162. Contact by tip 164 forces residual valve 158 to lift off of residual protrusion 161.

Figure 5B:
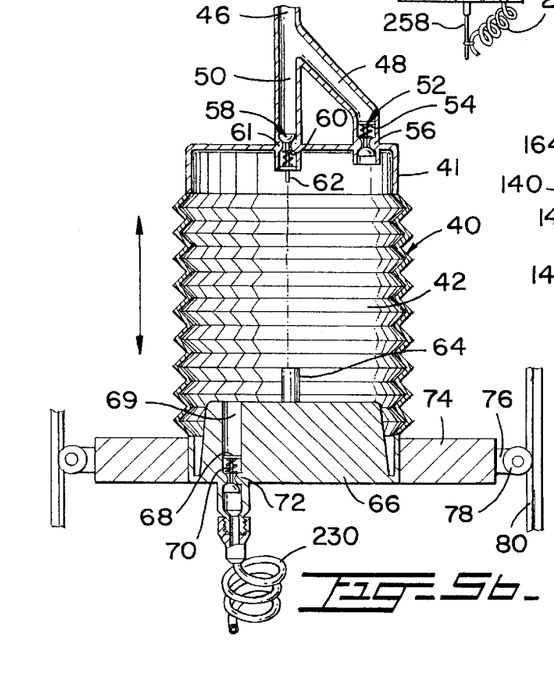
FIG. 5b represents an isometric view of the high-wave air compressor bellow system.
Figure 5C:
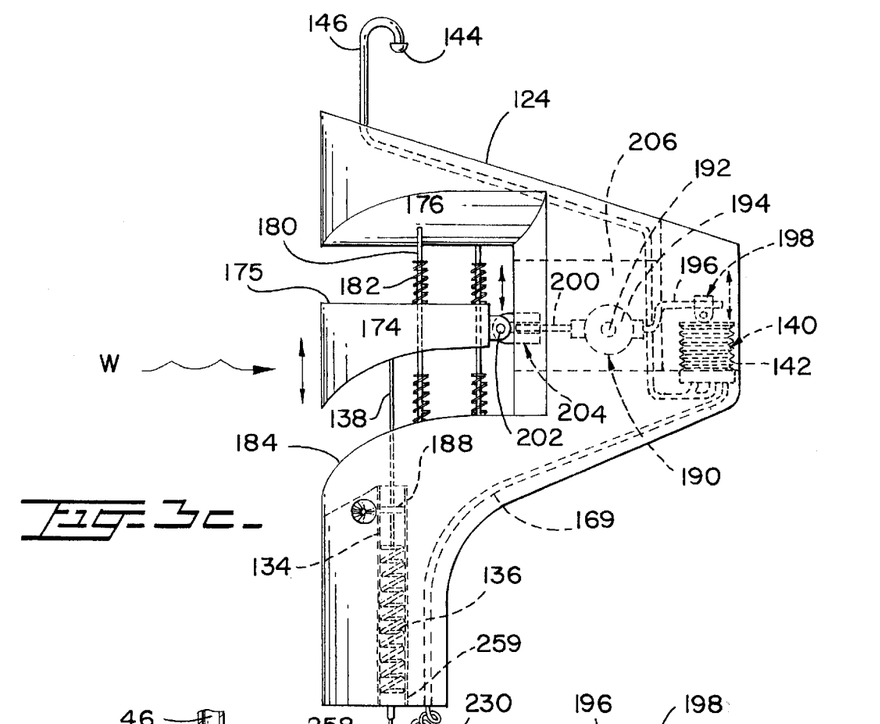

As seen in FIG. 5b, bellow assembly 40 has bellow 42 secured between platform 74 and valve base 41. Secured onto platform 74 is base 66. Base 66 complements the height of bellow 42 in a collapsed mode, so that a maximum amount of air within bellow 42 is displaced from and to the adjacent valves. Base 66 has tip 64 to coact with residual valve tip 62 when biased against it. Valve base 41 primarily includes inlet valve 52 and residual valve 58. Extending from valve base 41, inlet valve 52 has inlet spring 54, which keeps inlet valve 52 biased against inlet protrusions 56 in the relaxed state. Extending from valve base 41, residual valve 58 has residual spring 60, which keeps residual valve 58 biased against residual protrusions 61 in the relaxed state. Extending from base 66, outlet valve 68 has outlet spring 70, which keeps outlet valve 68 biased against outlet protrusions 72 in the relaxed state.

When platform 74 travels in a downward direction, bellow 42 expands. As bellow 42 expands, the force within overcomes the force of inlet spring 54, opening inlet valve 52 and allowing air to flow from tube 46 through inlet tube 48, and into bellow 42. When platform 74 travels in an upward direction, when met by a water wave, bellow 42 contracts. As bellow 42 contracts, the force of compressed air within overcomes the force of outlet spring 70, opening outlet valve 68 and allowing compressed air to flow to compressed air line 230. After bellow 42 is fully compressed there may remain some residual air. In that case, any remaining residual air will flow out through residual tube 50 when tip 64 makes contact with residual valve tip 62. Contact by tip 64 forces residual valve 58 to lift off of residual protrusion 61.

In an alternate configuration for the high-wave pump assembly 20, three weights 232 form a triangle on floor F. Extending from weights 232 are cables 242, which connect to pontoons 236 and buoys 252 respectively. Continuing from pontoons 236, cables 242 extend to a plurality of high-wave pump assemblies 20 and finally to a buoy 252, at the center of the triangle. Configuration of other shapes may also be designed utilizing the instant invention.

High-wave pump assembly 20 and low-wave pump assembly 120 are made of a material that floats and is resistant to corrosion. Additionally, all springs utilized in the instant invention have protective insulation to prevent corrosion.

A plurality of apparatus as the instant invention may form a group in a body of water to supply large quantities of compressed air and the body of water must be one that has sufficient waves to operate said air compressor system. Additionally, as a group in a body of water, the instant invention has characteristics to prevent beach erosion. This is achieved when the momentum of the water waves is obstructed initially with high-wave pump assembly 20, and then low-wave pump assembly 120. The reduction of wave force on a beach helps to reduce overall beach erosion.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An air compressor system, comprising:
   A) a first housing assembly with first and second ends, said first housing assembly having a first air vent protruding from said first end and a first anchor secured to said second end, said first housing assembly having at least one hole for a wave of water to enter and a platform with third and fourth ends, said third end having a first bellow assembly secured thereon, said fourth end having at least one cable connecting to a first spring, secured to said second end, said fourth end further having a first air line with fifth and sixth ends to deliver compressed air from said first bellow assembly, said first air line having a first one-way valve set at a first predetermined distance from said fifth end towards said sixth end without reaching said sixth end, to allow flow of compressed air along the length of said first air line, said platform compressing air within said first bellow assembly when said wave of water enters said first housing assembly;
   B) a second housing assembly with seventh and eighth ends, said second housing assembly having a second air vent protruding from said seventh end and a second anchor secured to said eighth end, said second housing assembly having a float with ninth and tenth ends, said second housing assembly further comprising a second bellow assembly, said float having at least one cable connecting to a second spring, secured to said eighth end, said eighth end having a second air line with ninth and tenth ends to deliver compressed air from said second bellow assembly, said second air line having a second one-way valve set at a second predetermined distance from said ninth end towards said tenth end without reaching said tenth end, to allow flow of compressed air along the length of said second air line, said float compressing air within said second bellow assembly when said wave of water contacts said float; and
   C) a stabilizing system to stabilize said first and second housing assemblies in a body of water, also comprising an air tank to receive said compressed air from said first and second air lines.

2. The air compressor system set forth in claim 1, wherein said stabilizing system further comprises buoys, said buoys secured to said first and second housing assembly with a first cable having eleventh and twelfth ends, said eleventh and twelfth ends having first weights, said stabilizing system further comprising first and second pontoons at a first predetermined depth in said body of water, said pontoons with a third anchor and having a pulley connected to first and second springs to coact with said first cable.

3. The air compressor system set forth in claim 2, wherein said platform further includes a flow of said wave of water in and out of said first housing assembly, said wave of water in and out causing the movement of said platform and said first bellow assembly when ambient air enters said first bellow assembly through a third one-way valve within said first air vent upon a first vertical platform movement when said wave of water exits said first housing assembly, and compressed air escapes from said first bellow assembly through said first one-way valve within said first air line, upon a second vertical platform movement when said wave of water enters said first housing assembly.

4. The air compressor system set forth in claim 3, wherein said first air vent includes an end-cap to prevent foreign matter from entering, said platform has at least one end-stop that limits the travel distance of said platform, said air tank has a pressure relief valve, wherein a plurality of apparatus constructed form a group in a body of water to supply large quantities of compressed air, and said body of water is one that has sufficient waves to operate said air compressor system.

5. The air compressor system set forth in claim 2, further including a flow of said wave of water onto said float, said wave of water onto said float causing the movement of said float, said float cooperating with said second bellow assembly when ambient air enters said second bellow assembly through a fourth one-way valve within said second air vent upon a first vertical float movement when said wave of water exits said second housing assembly, and compressed air escapes from said second bellow assembly through said second one-way valve within said second air line, upon a second vertical float movement when said wave of water strikes said second housing assembly.

6. The air compressor system set forth in claim 5, wherein said second air vent includes an end-cap to prevent foreign matter from entering, said float has at least one stop-spring above and below said float, said air tank has a pressure relief valve, wherein a plurality of apparatus constructed form a group in a body of water to supply large quantities of compressed air, and said body of water is one that has sufficient waves to operate said air compressor system.

* * * * *